July 12, 1949.　　　K. G. HUMLEGARD　　　2,475,745
PLUMB LINE HOLDER
Filed Feb. 20, 1946

*INVENTOR.*
KARL G. HUMLEGARD
BY *Victor J. Evans & Co.*
ATTORNEYS

Patented July 12, 1949

2,475,745

UNITED STATES PATENT OFFICE 2,475,745

PLUMB LINE HOLDER

Karl G. Humlegard, Washington, D. C.

Application February 20, 1946, Serial No. 649,035

1 Claim. (Cl. 33—207)

This invention relates to a plumb line holder.

As commonly manipulated, the ordinary plumb line is only approximately reliable, depending somewhat on the eye of the user and his skill in estimating when lines are parallel. Often two persons are necessary for accurate results, one to hold the top of the line in stable location and the other to work nearer the bottom end.

An object of the invention therefore is to provide a plumb line holder that can be used by a single workman, under practically any conditions met with in structural operations, to obtain very accurate results in a fraction of the time often required, and without danger of accidental slipping of the line.

This device is made in the form of what might be called a flattened spool, adapted for holding a length of line, when the plumb bob is not in use, and a sharp point or prong with which the device may be attached in horizontal position to the vertical member that is to be tested for perpendicularity.

The line is arranged for suspension from the device at a predetermined distance from the surface to which the device is attached. With the aid of an ordinary rule the distance of the point of the plumb bob from the same surface is measured at a lower level, and difference in the distances indicating the exact amount of departure of the surface from plumb position.

Among the advantages of the device the following are thought to be important: It is practical and efficient in use, greatly facilitating the plumbing of any structure. It is compact, easily carried and handled, simple in construction, of low productive cost, and can be retailed inexpensively. It is a handy and useful device that could easily be carried in the kit of a carpenter, mason, engineer or surveyor, and should have a place in every machine shop, home or farm workshop.

With the above and other objects and advantages in view, the invention consists of the novel details of construction, arrangement and combination of parts more fully hereinafter described, claimed and illustrated in the accompanying drawing in which Figure 1 is a side view of the device showing its application to a plumb line.

Figure 1:
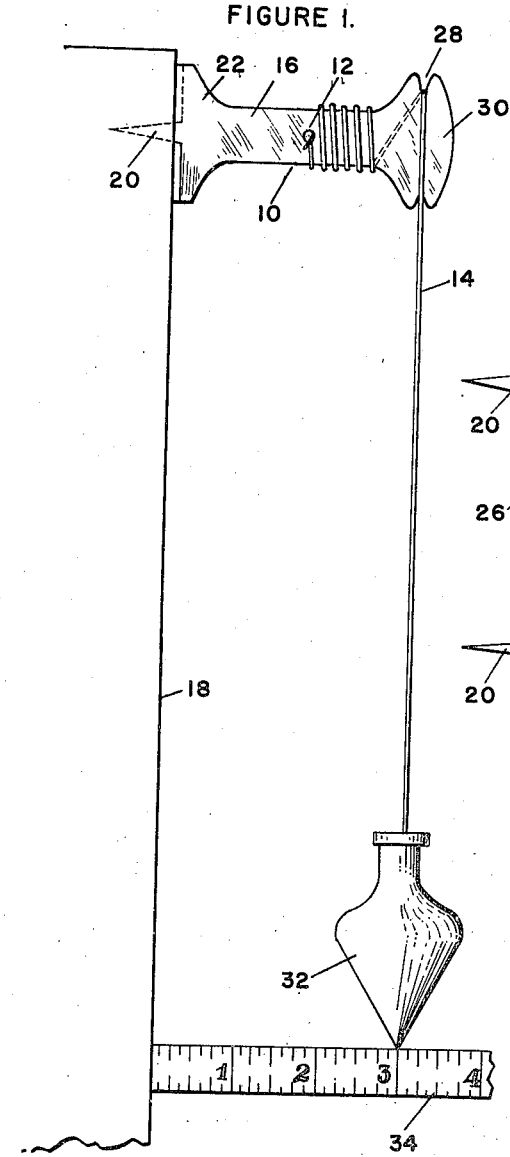
Figure 2:
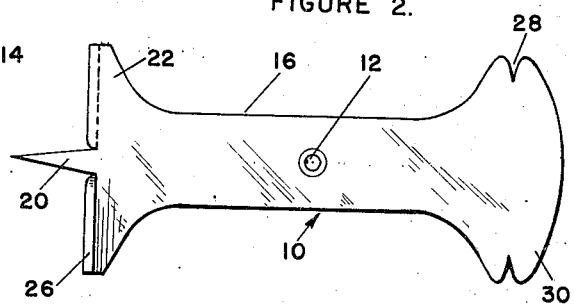
Figure 2 is a side view of the device with the plumb line removed.
Figure 3:
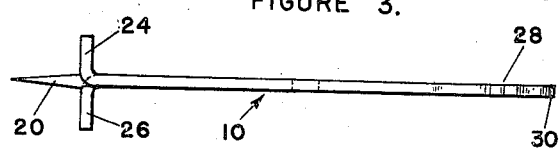
Figure 3 is an edge view of the device.

Referring more in detail to the drawing the numeral 10 designates the body of the device which may be stamped from a single piece of metal and assumes somewhat the shape of a flattened spool.

At the medial portion of the body 10 an opening 12 is provided for conveniently anchoring the plumb line 14 therein, and the line 14 can be wound over the concaved portion 16 of the body 10 when the line is not in use.

In Figure 1 the device is shown in operating position on a wall or post 18 the perpendicularity of which is to be tested and the body 10 is secured thereto by a prong 20 formed at the medial point of the rear enlarged end 22 of the body 10, which has been pushed into the post 18. The prong 20 is positioned intermediately of wings 24 and 26 respectively, which are bent in opposite directions with relation to the body and have close contact with the post 18 when the device is being used. The wings 24 and 26 prevent the body 10 from moving out of alinement with the post 18.

The distance from the outer faces of the wings 24 and 26 to a center line connecting the V-shaped notches 28 formed in the enlarged head 30 of the body is fixed at some predetermined distance, for example three inches. Therefore when the point of the plumb bob 32 which is attached to the line 14, and the line 14 trained over the upper notch 28, the bob 32 should be in alignment with the three inch mark of a ruler 34, which has the zero end placed against the post 18 as shown in Figure 1, when and if the post 18 is perpendicular.

Figure 5:
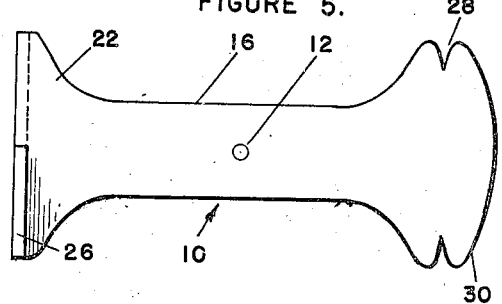
Figure 5 is a side view of the device with the prong removed.
Figure 6:
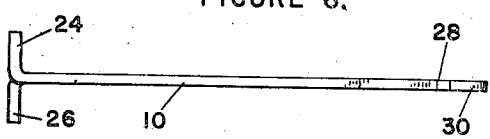
Figure 6 is an edge view of the device shown in Figure 5.
Figure 4:
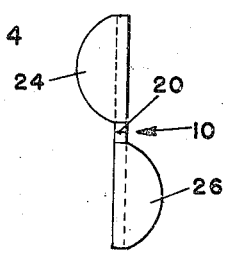
Figure 4 is an end view thereof.

In Figures 5 and 6 the device is provided without the prong 20 and the wings 24 and 26 are merely held in close contact with the post 18 without attachment thereto. The result would be the same and this form of device is more susceptible of use with brick or stone walls which it is undesirable to mar.

It is believed that the operation of the device will be apparent to those skilled in the art and it will also be apparent that the device will accomplish the objects of the invention.

It is to be understood, however, that modifications and changes in the details of construction, arrangement and combination of parts may be resorted to without departing from the spirit of the invention or the scope of the appended claim.

Having thus described the invention what is claimed, as new and desired to be secured by Letters Patent is:

In a plumb bob line holder, the combination which comprises a flat body member having a longitudinally disposed shank with enlarged sections at the ends, one of said ends having a centrally disposed pointed member extended in the same plane as that of the shank and two oppositely disposed flanges, one on each side of the said pointed member and both positioned perpendicular to the plane of said shank, said flanges spaced from the end of said pointed member and providing an extending bearing area for supporting said holder in a horizontal position for use, the enlarged section at the other end of the shank having aligned line receiving V-shaped notches in the opposite edges thereof spaced from the adjacent end and positioned a predetermined distance corresponding with a unit of measure from the faces of the said oppositely disposed flanges at the opposite ends, and said body member having an opening through the intermediate portion thereof for attaching a plumb bob line thereto.

KARL G. HUMLEGARD.

REFERENCES CITED

The following references are of record in the file of this patent:

UNITED STATES PATENTS

| Number | Name | Date |
| --- | --- | --- |
| 922,171 | Loeven | May 18, 1909 |
| 1,271,128 | Brizendine | July 2, 1918 |
| 1,824,321 | Baker | Sept. 22, 1931 |
| 1,874,057 | Murphy | Aug. 30, 1932 |
| 2,343,688 | Maxey | Mar. 7, 1944 |